United States Patent
Smith (12)

(10) Patent No.: US 6,169,784 B1
(45) Date of Patent: Jan. 2, 2001

(54) TELECOMMUNICATION LINE TERMINATION TEST

(75) Inventor: Raymond D Smith, Warrington (GB)

(73) Assignee: Marconi Communications Limited (GB)

( * ) Notice: Under 35 U.S.C. 154(b), the term of this patent shall be extended for 0 days.

(21) Appl. No.: 09/144,783

(22) Filed: Sep. 1, 1998

(30) Foreign Application Priority Data

Feb. 9, 1998 (GB) .................................................... 9718428

(51) Int. Cl.$^7$ .............................. H04M 1/24; H04M 3/08; H04M 3/22
(52) U.S. Cl. ................................ 379/27; 379/29; 379/30; 324/519
(58) Field of Search .................................... 379/1, 12, 16, 379/19, 24, 25–26, 27–29, 30; 324/512, 519, 520–521, 522, 524, 525, 535

(56) References Cited

U.S. PATENT DOCUMENTS

| | | |
|---|---|---|
| 4,373,121 | 2/1983 | Sartori et al. . |
| 4,550,223 | 10/1985 | Poitevin . |
| 6,084,946 | * 7/2000 | Beierle ..................................... 379/30 |

FOREIGN PATENT DOCUMENTS 2 269 073    1/1994   (GB) .

* cited by examiner

Primary Examiner—Curtis A. Kuntz
Assistant Examiner—Duc Nguyen
(74) Attorney, Agent, or Firm—Kirschstein, et al

(57) ABSTRACT

In a 2-wire connection from a telephone exchange to a subscriber, the connection is made via a subscriber line interface circuit (SLIC) and a termination box, the termination box having a capacitor and a resistor connected in series between the two wires of the connection and between the SLIC and the subscriber. The SLIC includes means to reverse the polarity between the two wires of the connection and there is measuring means whereby the current required to change the capacitor to the opposite polarity may be measured enabling determination of the impedance between the two wires of the connection.

2 Claims, 1 Drawing Sheet

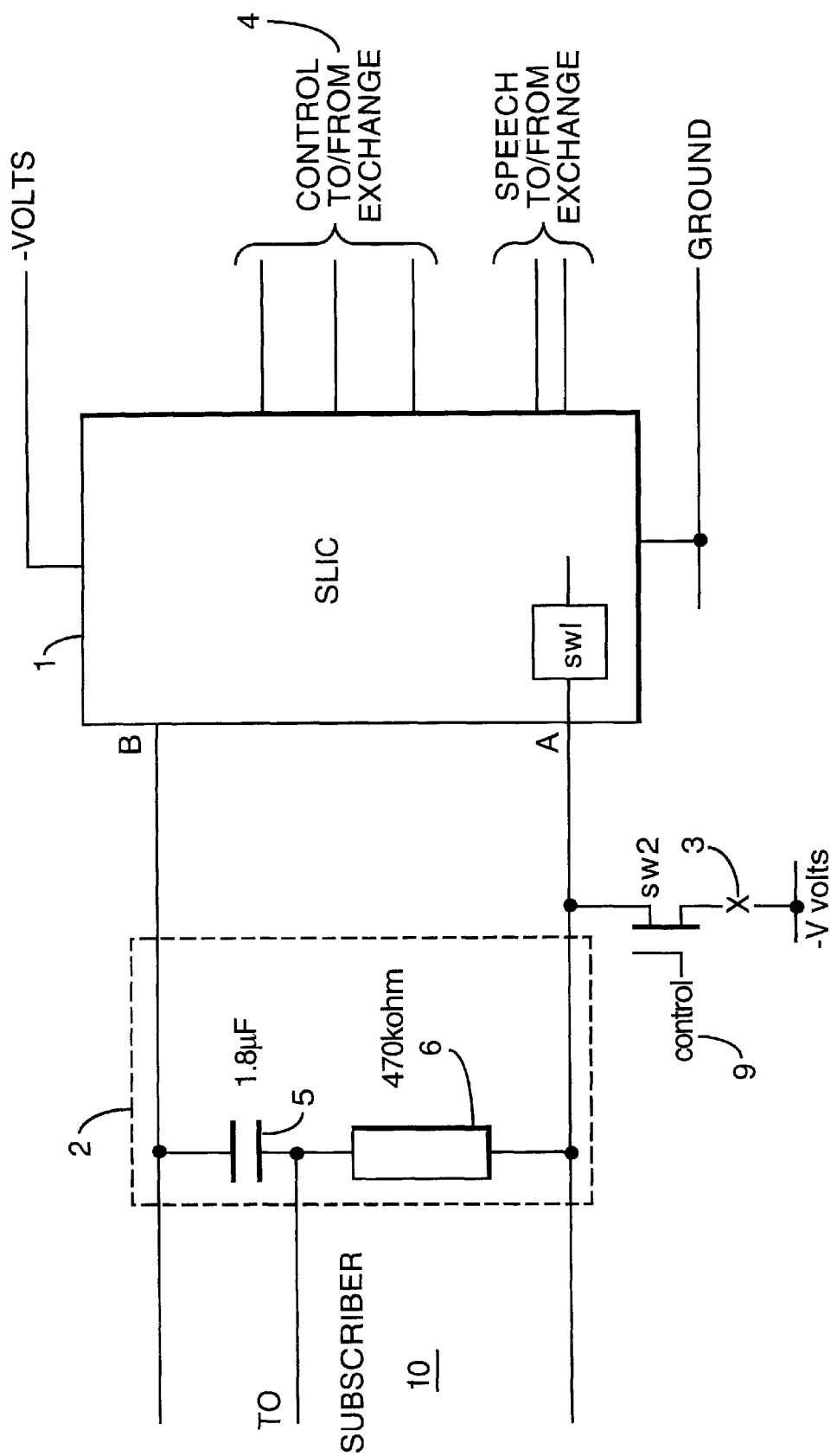

TELECOMMUNICATION LINE TERMINATION TEST

BACKGROUND OF THE INVENTION

Field of the Invention

A need is arising for a low cost means of testing the impedance presented by a two-wire telecommunications line. This could be used to determine line leakage or detect the presence of terminating equipment (e.g. a telephone). This could also detect fault conditions such as open or short circuits.

A proposed situation where this could be useful is where an Integrated Services Digital Network (ISDN) line is terminated to provide an ISDN connection together with a 2-wire analogue connection.

The detection of the presence of a telephone connected to a 2-wire analogue port is regarded as being where the real part of the load impedance is 300 Kohm or less.

The circuit component which interfaces from an exchange to a 2-wire connection is a subscriber line interface circuit (SLIC) which is normally located at the exchange or a remote concentrator. A SLIC is commonly an integrated circuit and has a line reversal function and a means of disconnecting one of the 2-wire connections. An example of a SLIC is described in Patent No. GB 2093314B.

One method by which a telephone subscriber loop may be tested is described in Patent Application No. GB2269073 where an electrical impulse is applied across the legs of the loop and the nature of the resulting transient voltage due to current in the loop is determined. The impulse may be provided by reversing the polarity of a power supply to the loop. The transient can be measured by a differential amplifier coupled across a resistor in series with the loop. Typically the maximum voltage, the time taken for the voltage to decay to a particular fraction of the maximum and the long term residual voltage are measured. These measurements are returned to the exchange to identify fault conditions in the loop. The disclosure require series resistors in the connecting legs and the addition of a relay to provide switching.

SUMMARY OF THE INVENTION

According to the present invention there is provided a connection from a telephone exchange to a subscriber, the connection being made via a subscriber line interface circuit (SLIC) and a termination box, there being a 2-wire connection between the SLIC and the subscriber, the termination box having a capacitor and a resistor connected in series between the two wires of the connection and between the SLIC and the subscriber, the SLIC including a switch for disconnecting one wire of the 2-wire connection and a further switch connected to the said one wire and to a SLIC supply rail and having a current monitoring point in series therewith, whereby the time required to discharge the capacitor may be monitored enabling determination of the impedance between the two wires of the connection.

BRIEF DESCRIPTION OF THE DRAWING

The single figure shows a diagrammatic representation of a connection from a telephone exchange to a subscriber.

DESCRIPTION OF THE PREFERRED EMBODIMENT

The present invention will now be described by way of example, with reference to the figure, which figure shows a SLIC 1 connected between an exchange (not shown) and a subscriber 10 the connection between the SLIC 1 and the subscriber 10 being via a subscriber termination box 2 by a 2-wire connection which has connection legs A, B and a capacitor 5 in series with a resistor 6 between the legs A, B.

The SLIC 1 includes a switch to disconnect the A-leg of the two-wire connection and means to monitor the A-leg discharge current and further SLIC 1 has a switch SW1 which will disconnect the leg A, normally the switch SW1 being intended in a SLIC to enable the detection of earth calling/ground key signalling. Further in the SLIC 1 a switch SW2 is connected from the leg A to the negative voltage rail having a current monitoring position 3 in the connection.

Initially the switch SW1 is closed and the switch SW2 is open and a voltage is applied by the SLIC 1 between the A and B legs. This charges the capacitor 5 and the inherent 2W line capacitance. For practical line lengths the line capacitance is small compared with the capacitor 5 and so may be ignored.

A control signal 9 from the exchange is applied to the SLIC 1 which causes switch SW1 to open and the switch SW2 to close, the discharge current from the capacitor 5 via the resistor 6 can then be monitored and the circuit impedance determined by measuring the time for the current to fall to a predetermined level or measuring the current after a predetermined time.

By applying a line reversal using the SLIC 1 immediately prior to opening switch SW1 and closing switch SW2 the current levels can be doubled making measurement easier and more accurate.

The arrangement described has the advantage that the effect of any quiescent feed current is removed and no calibration is required and does not require the provision of additional relays to provide the switches SW1 and SW2 which are required by previous arrangements. Further, the arrangement described does not require the use of resistors and diodes in series with the power supply, which components would waste power and reduce the possible length of a line which could be fed.

What I claim is:

1. An apparatus for determining an impedance between two wires of a 2-wire connection connected between a subscriber line interface circuit (SLIC) and a subscriber circuit, the apparatus comprising a connection from a telephone exchange to the subscriber circuit, the connection being made via the SLIC and a termination box; the termination box having a capacitor and a resistor connected in series between the two wires of the 2-wire connection and the termination box being located between the SLIC and the subscriber circuit; the SLIC including a switch for disconnecting one wire of the 2-wire connection and a further switch connected to the one wire and a SLIC supply rail and having a current monitor point in series therewith, wherein the time required to discharge the capacitor may be monitored enabling determination of the impedance between the two wires of the 2-wire connection.

2. The apparatus as claimed in claim 1, further including means to reverse the polarity between the wires of the 2-wire connection by a control signal applied to the SLIC from the exchange.

* * * * *